(12) United States Patent
Liu

(10) Patent No.: US 11,360,340 B2
(45) Date of Patent: Jun. 14, 2022

(54) LIQUID CRYSTAL DISPLAY PANEL

(71) Applicant: WUHAN CHINA STAR OPTOELECTRONICS TECHNOLOGY CO., LTD., Hubei (CN)

(72) Inventor: Fancheng Liu, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 105 days.

(21) Appl. No.: 16/495,181

(22) PCT Filed: May 22, 2019

(86) PCT No.: PCT/CN2019/087908
§ 371 (c)(1),
(2) Date: Sep. 18, 2019

(87) PCT Pub. No.: WO2020/191909
PCT Pub. Date: Oct. 1, 2020

(65) Prior Publication Data
US 2021/0405414 A1 Dec. 30, 2021

(30) Foreign Application Priority Data
Mar. 27, 2019 (CN) .......................... 201910236973.8

(51) Int. Cl.
*G02F 1/1333* (2006.01)
*G06V 40/13* (2022.01)
*G02F 1/1335* (2006.01)

(52) U.S. Cl.
CPC .... *G02F 1/13338* (2013.01); *G02F 1/133514* (2013.01); *G06V 40/13* (2022.01)

(58) Field of Classification Search
CPC ....................... G02F 1/133514; G02F 1/13338
See application file for complete search history.

(56) References Cited

U.S. PATENT DOCUMENTS

2008/0036951 A1* 2/2008 Tsai .................... G02F 1/13338
349/110
2015/0253626 A1 9/2015 Zhang et al.

FOREIGN PATENT DOCUMENTS

| CN | 108267902 A | 7/2018 |
|----|-------------|--------|
| CN | 108563052 A | 9/2018 |

* cited by examiner

*Primary Examiner* — Jessica M Merlin

(57) ABSTRACT

A liquid crystal display panel includes a plurality of pixel units arranged in an array, and a plurality of fingerprint identification units arranged in one-to-one correspondence with the plurality of pixel units; each of the pixel units includes four sub-pixels arranged in two rows and two columns, the four sub-pixels include a white sub-pixel; and each projection of each of the fingerprint identification units in a direction perpendicular to the liquid crystal display panel covers a portion of the white sub-pixel in its corresponding pixel unit.

17 Claims, 4 Drawing Sheets

LIQUID CRYSTAL DISPLAY PANEL

FIELD OF INVENTION

This invention relates to the field of display panel technologies, and, in particular, to a liquid crystal display panel.

BACKGROUND OF INVENTION

With continuous development of technology, screen-to-body ratio of mobile terminals such as mobile phones has been increasing continuously, and full screen mobile terminals have become a development trend. In order to realize LCD (liquid crystal display)-based in-screen fingerprint identification, the conventional technique provides a display panel, as shown in FIG. 1, the display panel includes an RGBW unit 100. The RGBW unit 100 includes a red sub-pixel 101, a blue sub-pixel 102, a green sub-pixel 103, a white sub-pixel 104, and a fingerprint identification unit 105. Wherein the RGBW unit 100 is designed in a horizontal layout, that is, the fingerprint identification unit 105 and the white sub-pixels 104 are vertically arranged, and then the whole is further arranged laterally with the red sub-pixels 101, a blue sub-pixel 102, and a green sub-pixel 103.

However, this design results in a spacing between laterally adjacent fingerprint identification units 105 is greater than a lateral width of the three sub-pixels, and excessive spacing will reduce the accuracy of fingerprint identification. Moreover, the RGB sub-pixels between the laterally adjacent fingerprint identification units 105 increase interfering optical signal and noise. In addition, in the visible light band, fingerprint identification is performed by using light having a wavelength less than 580 nm. If the backlight source is directly used for fingerprint identification, interfering optical signal and noise is increased, which is not conducive to fingerprint identification.

Technical Problems

The embodiment of the invention provides a liquid crystal display panel to solve the problem of high interfering optical signal and noise and low accuracy of fingerprint identification of conventional display panels.

SUMMARY OF INVENTION

The embodiment of the present invention provides a liquid crystal display (LCD) panel, including a plurality of pixel units arranged in an array, and a plurality of fingerprint identification units arranged in one-to-one correspondence with the plurality of pixel units;

each of the pixel units including four sub-pixels arranged in two rows and two columns, the four sub-pixels including a white sub-pixel; and each projection of each of the fingerprint identification units in a direction perpendicular to the liquid crystal display panel covering a portion of the white sub-pixel in its corresponding pixel unit.

Further, sizes and shapes of all of the sub-pixels are the same.

Further, the four sub-pixels include a red sub-pixel, a blue sub-pixel, and a green sub-pixel;

the red sub-pixel is diagonally disposed with the white sub-pixel, and the blue sub-pixel is disposed diagonally with the green sub-pixel.

In an embodiment, each of the white sub-pixels is provided with a filter layer on a side away from its corresponding fingerprint identification unit.

In another embodiment, each of the white sub-pixels is provided with a hollow portion, and the hollow portion is filled with filter material to form a filter layer.

Further, the projection of each of the fingerprint identification units in the direction perpendicular to the liquid crystal display panel covers a portion of the corresponding filter layer, or the projection of each of the fingerprint identification units in the direction perpendicular to the liquid crystal display panel covers the whole of the corresponding filter layer, or the projection of each of the fingerprint identification units in the direction perpendicular to the liquid crystal display panel and the corresponding filter layer have no overlap.

Further, the material of the filter layer is a photoresist for filtering light having a wavelength of at least 580 nm.

Further, the liquid crystal display panel includes an array substrate and a cover plate disposed opposite to each other;

the pixel units are disposed on a side of the cover plate facing the array substrate, and the fingerprint identification units are disposed between the pixel units and the array substrate.

Further, the fingerprint identification units are photosensitive sensors.

The embodiment of the present invention further provides a liquid crystal display panel, including a plurality of pixel units arranged in an array, and a plurality of fingerprint identification units arranged in one-to-one correspondence with the plurality of pixel units;

each of the pixel units including four sub-pixels arranged in two rows and two columns, the four sub-pixels including a white sub-pixel; shading gaps formed between adjacent sub-pixels; and each projection of each of the fingerprint identification units in a direction perpendicular to the liquid crystal display panel covering a portion of the white sub-pixel and the shading gap in its corresponding pixel unit.

Further, sizes and shapes of all of the sub-pixels are the same; the spacing between two adjacent fingerprint identification units in the same row is less than or equals to the sum of a width of one of the sub-pixels and widths of the shading gaps on both sides of one of the sub-pixels.

Further, the four sub-pixels further include a red sub-pixel, a blue sub-pixel, and a green sub-pixel;

the red sub-pixel is diagonally disposed with the white sub-pixel, and the blue sub-pixel is disposed diagonally with the green sub-pixel.

In an embodiment, each of the white sub-pixels is provided with a filter layer on a side away from its corresponding fingerprint identification unit.

In another embodiment, each of the white sub-pixels is provided with a hollow portion, and the hollow portion is filled with filter material to form a filter layer.

Further, the projection of each of the fingerprint identification units in the direction perpendicular to the liquid crystal display panel covers a portion of the corresponding filter layer, or the projection of each of the fingerprint identification units in the direction perpendicular to the liquid crystal display panel covers the whole of the corresponding filter layer, or the projection of each of the fingerprint identification units in the direction perpendicular to the liquid crystal display panel and the corresponding filter layer have no overlap.

Further, the material of the filter layer is a photoresist for filtering light having a wavelength of at least 580 nm.

Further, the liquid crystal display panel includes an array substrate and a cover plate disposed opposite to each other;

the pixel units are disposed on a side of the cover plate facing the array substrate, and the fingerprint identification units are disposed between the pixel units and the array substrate.

Beneficial Effect

The beneficial effect of the invention are as follows: each of the pixel units corresponds to a fingerprint identification unit, and each of the pixel units includes four sub-pixels arranged in two rows and two columns, a projection of each of the fingerprint identification units in a direction perpendicular to the liquid crystal display panel covers a portion of the a white sub-pixel in its corresponding pixel unit, thereby reducing the spacing between adjacent fingerprint identification units in the same row, reducing interfering optical signal and noise, and improving accuracy of fingerprint identification; the projection of each of the fingerprint identification units in the direction perpendicular to the liquid crystal display panel further covers the shading gaps, thereby reducing the covering of the fingerprint identification units to the white sub-pixels, improving amount of light transmission of the white sub-pixels, and improving light utilization rate; the filter layers are disposed to filter interfering lights, and further to reduce the interfering optical signal and noise.

DESCRIPTION OF DRAWINGS

In order to more clearly illustrate the technical solutions in the embodiments of the present invention, the drawings which are used in the description of the embodiments will be briefly described below. It is obvious that the drawings in the following description are only some embodiments of the present invention. Other drawings can also be obtained from those skilled in the art without paying any creative effort.

DETAILED DESCRIPTION OF PREFERRED EMBODIMENTS

The Preferred embodiments of the present invention with reference to the accompanying drawings are described below to illustrate that the invention can be practiced. These embodiments can fully introduce the technical content of the present invention to those skilled in the art, so that the technical content of the present invention is clearer and easier to understand. However, the invention may be embodied in many different forms of embodiments, and the scope of the invention is not limited to the embodiments mentioned herein.

The terms used in the description of the present invention are only used to describe specific embodiments, and are not intended to show the concepts of the present invention. Unless explicitly described to the difference, a singular form includes a plural form in the present specification. In the specification of the present invention, it is to be understood that the terms such as "including," "having," and "comprising" are intended to indicate the existence of the features, numbers, steps, actions, or combinations in the invention, and are not intended to preclude the possibility that one or more other features, numbers, steps, actions, or combinations thereof may exist or may be added. The same reference number represents the same element in all drawings.

Figure 1:
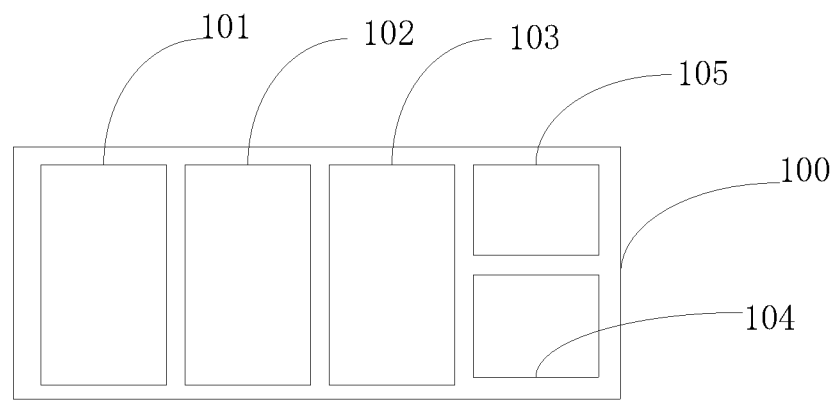
FIG. 1 is a schematic structural diagram of an RGBW unit of a display panel in the prior art.
Figure 2:
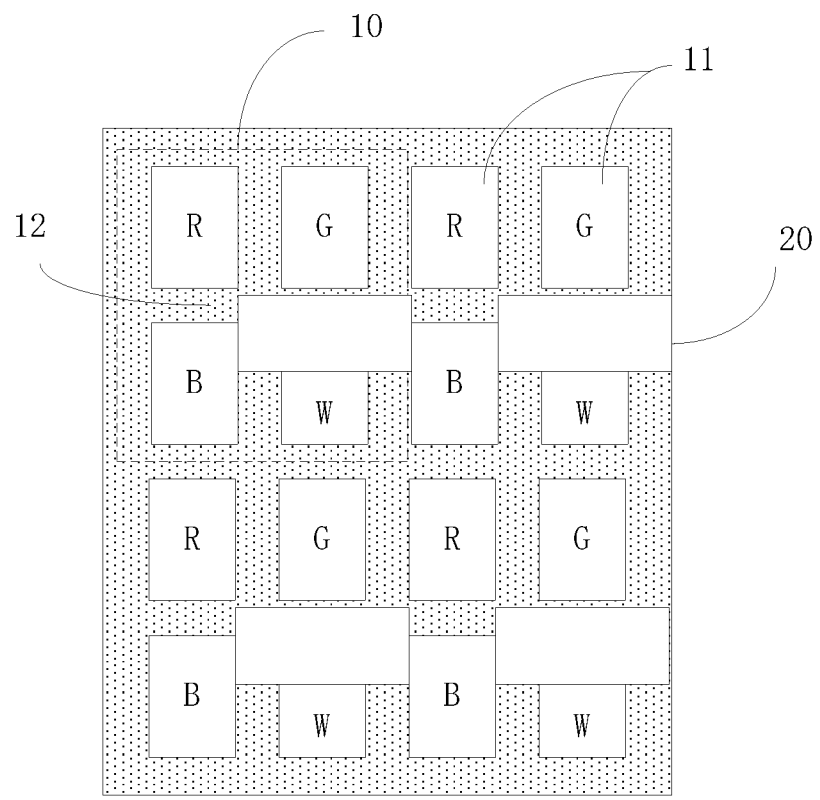
FIG. 2 is a positional relationship diagram between a pixel unit and a fingerprint recognition unit in a liquid crystal display panel according to an embodiment of the present invention.

As shown in FIG. 2, the embodiment provides a liquid crystal display panel, including a plurality of pixel units 10 arranged in an array, and a plurality of fingerprint identification units 20 arranged in one-to-one correspondence with the plurality of pixel units 10. Wherein the plurality of fingerprint identification units 20 are photosensitive sensors. Each of the pixel units 10 includes four sub-pixels 11, and the four sub-pixels 11 include a white sub-pixel W, so that each of the fingerprint identification units corresponds to a white sub-pixel W.

The four sub-pixels 11 of each of the pixel units 10 constitute a structure of two rows and two columns. Optionally, sizes and shapes of the four sub-pixels 11 are the same, and the shape of each sub-pixel 11 is a rectangle, so that the pixel unit 10 composed of the four sub-pixels 11 has a rectangular shape. A projection of each of the fingerprint identification units 20 in a direction perpendicular to the liquid crystal display panel covers a portion of the white sub-pixel W in its corresponding pixel unit 10, i.e. the projection of each of the fingerprint identification units 20 in a direction perpendicular to the liquid crystal display panel overlaps the portion of the corresponding white sub-pixel W.

It should be noted that the fingerprint identification units 20 may be in a rectangular shape, and the projection of each of the fingerprint identification unit 20 may cover the upper half, the middle portion or the lower half of the corresponding white sub-pixel W, and is not specifically limited herein. In this embodiment the four sub-pixels 11 of each of the fingerprint identification units 20 are arranged in two rows and two columns, and each of the fingerprint recognition units 20 is correspondingly disposed with each of the white sub-pixels W, so that the spacing between the adjacent fingerprint recognition units 20 in the same row is reduced, and the number of sub-pixels between the adjacent fingerprint recognition units 20 in the same row is also reduced, the interfering optical signal and noise is reduced, and accuracy of fingerprint identification is improved.

Further, as shown in FIG. 2, each of the pixel units 10 further includes a red sub-pixel R, a blue sub-pixel B, and a green sub-pixel G, that is the other three sub-pixels of the four sub-pixels 11 are a red sub-pixel R, a blue sub-pixel B, and a green sub-pixel G. The red sub-pixel R is diagonally disposed with the white sub-pixel W, and the blue sub-pixel B is disposed diagonally with the green sub-pixel G. In general, fingerprint identification is performed by using light having a wavelength less than 580 nm, so the white sub-pixel W is disposed adjacent to the blue sub-pixel B and the green sub-pixel G, and the white sub-pixel W is disposed away from the red sub-pixel R, so that enable the fingerprint identification unit 20 to maximize the utilization of the illumination of the blue sub-pixel B and the green sub-pixel G, but is not easily affected by the illumination of the red sub-pixel R, thereby reducing the interfering optical signal and noise.

Further, as shown in FIG. 2, shading gaps 12 are formed between adjacent sub-pixels 11; and a projection of each of the fingerprint identification units 20 in a direction perpendicular to the liquid crystal display panel covers a portion of the white sub-pixel W and the shading gap 12 in its corresponding pixel unit 10.

It should be noted that the shading gaps 12 are used for disposing data lines and scan lines, and the shading gaps 12 are non-transparent areas. Shading gaps 12 are provided around each of the sub-pixels 11. A portion of the projection of each of the fingerprint identification units 20 in the direction perpendicular to the liquid crystal display panel covers a portion of the corresponding white sub-pixel W, and another portion of the projection of each of the fingerprint identification units 20 covers a portion of the shading gaps 12 around the white sub-pixel W, i.e. a portion of each of the fingerprint identification units 20 corresponds the shading gaps 12, and another portion of each of the fingerprint identification units 20 corresponds the white sub-pixel W. The portions of the white sub-pixels W which are covered by the fingerprint identification units 20 are non-transparent, and the portions of the white sub-pixels W which are not covered by the fingerprint identification units 20 are transparent, so while keeping the sizes of the fingerprint identification units 20, the covering of the white sub-pixels W by the fingerprint identification units 20 is reduced by using the shading gaps, that is, the proportion of the fingerprint identification units 20 in open regions of the white sub-pixels W is reduced, thereby increasing the light transmittance of the white sub-pixels W, and increasing the amount of light that eventually reaches the fingerprint, thereby improving the identification of the fingerprint.

Further, the spacing between two adjacent fingerprint identification units 20 in the same row is less than or equals to the sum of a width of one of the sub-pixels 11 and widths of the shading gaps 12 on both sides of one of the sub-pixels 11.

For example, as shown in FIG. 2, the fingerprint identification units 20 are in a rectangular shape, and the projection of each of the fingerprint identification units 20 in the direction perpendicular to the liquid crystal display panel covers an upper half of each of the white sub-pixels W, an upper half of each of the shading gaps 12 on both sides of one of the sub-pixels 11, and the shading gaps 12 on the top of the sub-pixels 11, so that the spacing between the two fingerprint identification units 20 adjacent to each other is made to be the width of one sub-pixel 11, thereby reducing the covering of the white sub-pixels W, and further reducing the spacing between the two adjacent fingerprint recognition units 20 in the same row, so the accuracy of fingerprint recognition is improved effectively.

Further, the liquid crystal display panel includes filter layers 30.

In a specific embodiment, each of the white sub-pixels W is provided with a filter layer 30 on a side away from its corresponding fingerprint identification unit 20.

Figure 3:
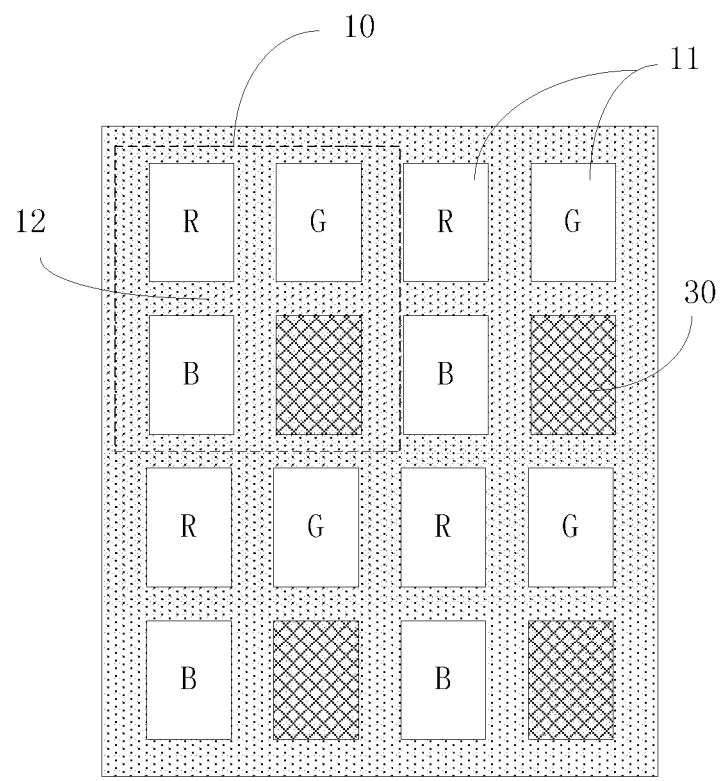
FIG. 3 is a positional relationship between a pixel unit and a filter layer in a liquid crystal display panel according to an embodiment of the present invention.
Figure 4:
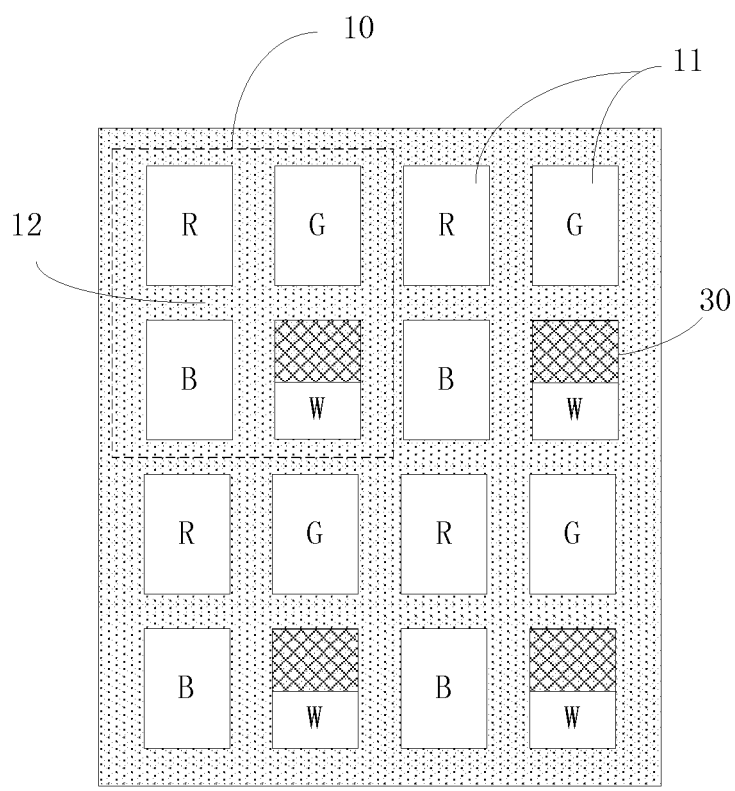
FIG. 4 is another positional relationship between a pixel unit and a filter layer in a liquid crystal display panel according to an embodiment of the present invention.
Figure 5:
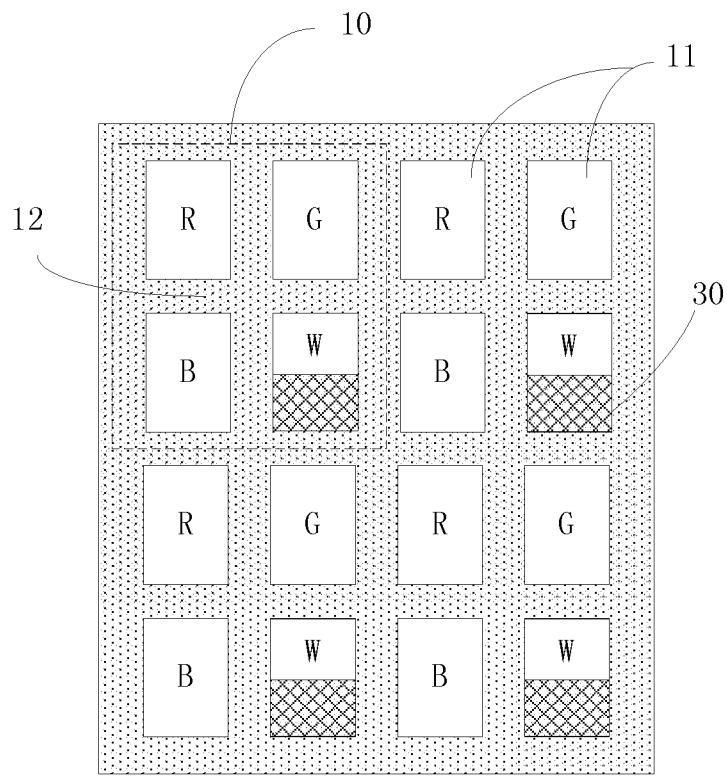
FIG. 5 is still another positional relationship between a pixel unit and a filter layer in a liquid crystal display panel according to an embodiment of the present invention.

It should be noted that each of the filter layers 30 may be disposed on the whole of each of the white sub-pixels W, or disposed on a portion of each of the white sub-pixels W. As shown in FIG. 2 and FIG. 3, if each of the filter layers 30 is disposed on the whole of each of the white sub-pixels W, the projection of each of the fingerprint identification units 20 in the direction perpendicular to the liquid crystal display panel covers a portion of the corresponding filter layer 30, i.e. the projection of each of the fingerprint identification units 20 overlaps the portion of the corresponding filter layer 30. At this time, the white sub-pixels W are not used as display pixels, they are turned on only during fingerprint identification. If each of the filter layers 30 is disposed on a portion of each of the white sub-pixels W, as shown in FIG. 2 and FIG. 4, the projection of each of the fingerprint identification units 20 in the direction perpendicular to the liquid crystal display panel covers the whole of the corresponding filter layer 30, i.e. positions of the fingerprint identification units 20 correspond to the positions of the filter layers 30. At this time, the white sub-pixels W are not used as display pixels, they are turned on only during fingerprint identification. Or as shown in FIG. 2 and FIG. 5, the projection of each of the fingerprint identification units 20 in the direction perpendicular to the liquid crystal display panel and the corresponding filter layer 30 have no overlap, i.e. positions of the fingerprint identification units 20 do not correspond to the positions of the filter layers 30. At this time, the white sub-pixels W can be used as display pixels.

In another specific embodiment, each of the white sub-pixels is provided with a hollow portion, and the hollow portion is filled with filter material to form a filter layer 30.

It should be noted that all of the transparent material in the open region of each of the white sub-pixels W may be hollowed out to form a hollow portion, or only a portion of the transparent material in the open region of each of the white sub-pixels W may be hollowed out to form a hollow portion. The hollow portions are filled with filter material to form filter layers 30. As shown in FIG. 2 and FIG. 3, if each of the filter layers 30 is disposed on the whole of the open region of each of the white sub-pixels W, the projection of each of the fingerprint identification units 20 in the direction perpendicular to the liquid crystal display panel covers a portion of the corresponding filter layer 30, i.e. the projection of each of the fingerprint identification units 20 overlaps the portion of the corresponding filter layer 30. At this time, the white sub-pixels W are not used as display pixels, they are turned on only during fingerprint identification. If each of the filter layers 30 is disposed on a portion of the open region of each of the white sub-pixels W, as shown in FIG. 2 and FIG. 4, the projection of each of the fingerprint identification units 20 in the direction perpendicular to the liquid crystal display panel covers the whole of the corresponding filter layer 30, i.e. positions of the fingerprint identification units 20 correspond to the positions of the filter layers 30. At this time, the white sub-pixels W are not used as display pixels, they are turned on only during fingerprint identification. Or as shown in FIG. 2 and FIG. 5, the projection of each of the fingerprint identification units 20 in the direction perpendicular to the liquid crystal display panel and the corresponding filter layer 30 have no overlap, i.e. positions of the fingerprint identification units 20 do not correspond to the positions of the filter layers 30. At this time, the white sub-pixels W can be used as display pixels.

Material of the filter layer is a photoresist for filtering light having a wavelength of at least 580 nm, such as a green photoresist or a cyan photoresist. In general, fingerprint identification is performed by using light having a wavelength less than 580 nm to reduce interfering optical signal and noise, so the filter layers 30 are provided to filter the light having a wavelength at least 580 nm in the backlight source to reduce the interfering optical signal and noise without affecting the normal display of the RGBW. It should be noted that the filter layer 30 can also be formed of a different material to filter lights having different wavelengths according to actual conditions.

Figure 6:
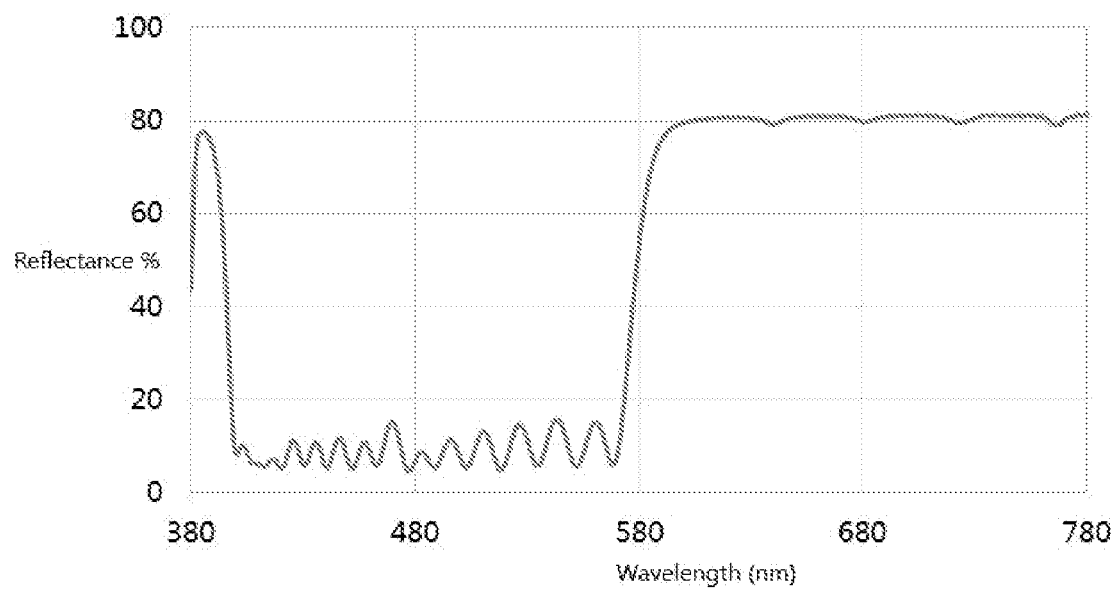
FIG. 6 is a reflection waveform diagram of a filter layer in a liquid crystal display panel according to an embodiment of the present invention.

As shown in FIG. 6, a band-pass coating or a band-reject coating is used to be the filter layer 30 to filter light from the backlight source. It can be seen that in the backlight source 80% of the light having a wavelength of at least 580 nm is reflected, that is, 80% of the light having a wavelength of at least 580 nm cannot pass through the filter layer 30, thereby filtering of light having a wavelength of at least 580 nm.

Figure 7:
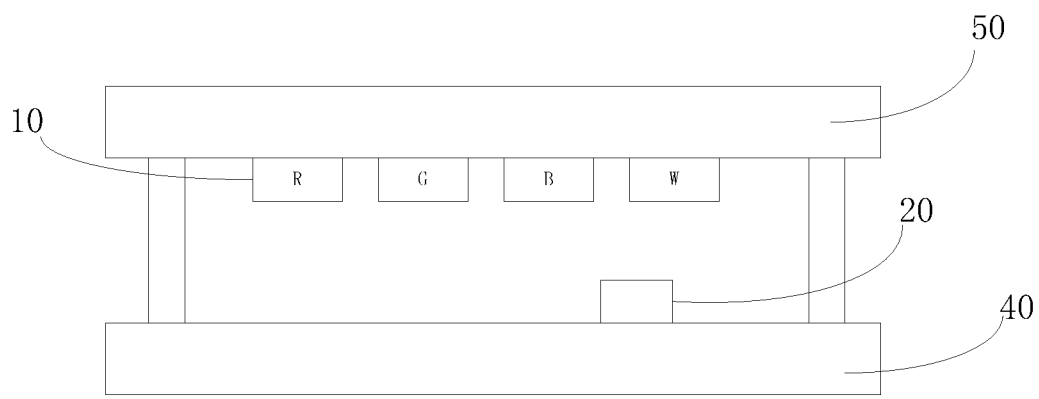
FIG. 7 is a schematic structural diagram of a liquid crystal display panel according to an embodiment of the present invention.

Further, as shown in FIG. 7, the liquid crystal display panel includes an array substrate 40 and a cover plate 50 disposed opposite to each other; the pixel units 10 are disposed on a side of the cover plate 50 facing the array substrate 40, and the fingerprint identification units 20 are disposed between the array substrate 40 and the pixel units 10.

It should be noted that, as shown in FIG. 7, the fingerprint identification units 20 may be disposed on a side of the array substrate 40 adjacent to the pixel units 10. In addition, the fingerprint identification units 20 may also be disposed on a side of the pixel unit 10 away from the cover 50.

It can be seen from the above that in the liquid crystal display panel provided in this embodiment, each of the pixel units corresponds to a fingerprint identification unit, and each of the pixel units includes four sub-pixels arranged in two rows and two columns, a projection of each of the fingerprint identification units in a direction perpendicular to the liquid crystal display panel covers a portion of the a white sub-pixel in its corresponding pixel unit, thereby reducing the spacing between adjacent fingerprint identification units in the same row, improving accuracy of fingerprint identification, and reducing interfering optical signal and noise; the projection of each of the fingerprint identification units in the direction perpendicular to the liquid crystal display panel further covers the shading gaps, thereby reducing the covering of the fingerprint identification units to the white sub-pixels, improving amount of light transmission of the white sub-pixels, and improving light utilization rate; the filter layers are disposed to filter interfering lights, and further to reduce the interfering optical signal and noise.

As described above, although the present invention has been described with the preferred embodiments thereof, those skilled in the art will appreciate that various modifications and additions are possible, without departing from the scope and the spirit of the invention. Accordingly, the scope of the present invention is intended to be defined only by reference to the claims.

What is claimed is:

1. A liquid crystal display (LCD) panel, comprising a plurality of pixel units arranged in an array and a plurality of fingerprint identification units arranged in one-to-one correspondence with the plurality of pixel units;
   each of the pixel units comprising four sub-pixels arranged in two rows and two columns, the four sub-pixels comprising a white sub-pixel; and each projection of each of the fingerprint identification units in a direction perpendicular to the liquid crystal display panel covering a portion of a corresponding white sub-pixel; and
   wherein the white sub-pixel is provided with a filter layer, and a material of the filter layer is a photoresist for filtering light having wavelengths above 580 nm.

2. The liquid crystal display panel as claimed in claim 1, wherein sizes and shapes of all of the four sub-pixels are same.

3. The liquid crystal display panel as claimed in claim 1, wherein the four sub-pixels further comprise a red sub-pixel, a blue sub-pixel, and a green sub-pixel;
   wherein the red sub-pixel is diagonally disposed with the white sub-pixel, and the blue sub-pixel is disposed diagonally with the green sub-pixel.

4. The liquid crystal display panel as claimed in claim 1, wherein the filter layer is disposed on a side away from a corresponding fingerprint identification unit.

5. The liquid crystal display panel as claimed in claim 1, wherein the white sub-pixel is provided with a hollow portion, and the hollow portion is filled with filter material to form the filter layer.

6. The liquid crystal display panel as claimed in claim 4, wherein the projection of each of the fingerprint identification units in the direction perpendicular to the liquid crystal display panel covers a portion of a corresponding filter layer or whole of the corresponding filter layer, or the projection of each of the fingerprint identification units in the direction perpendicular to the liquid crystal display panel does not overlap the corresponding filter layer.

7. The liquid crystal display panel as claimed in claim 5, wherein the projection of each of the fingerprint identification units in the direction perpendicular to the liquid crystal display panel covers a portion of a corresponding filter layer or whole of the corresponding filter layer, or the projection of each of the fingerprint identification units in the direction perpendicular to the liquid crystal display panel does not overlap the corresponding filter layer.

8. The liquid crystal display panel as claimed in claim 1, wherein the liquid crystal display panel further comprises an array substrate and a cover plate disposed opposite to each other; and
   wherein the pixel units are disposed on a side of the cover plate facing the array substrate, and the fingerprint identification units are disposed between the pixel units and the array substrate.

9. The liquid crystal display panel as claimed in claim 1, wherein the fingerprint identification units are photosensitive sensors.

10. A liquid crystal display panel, comprising a plurality of pixel units arranged in an array and a plurality of fingerprint identification units arranged in one-to-one correspondence with the plurality of pixel units;
   wherein each of the pixel units comprises four sub-pixels arranged in two rows and two columns, the four sub-pixels comprises a white sub-pixel, shading gaps are formed between adjacent sub-pixels, and each projection of each of the fingerprint identification units in a direction perpendicular to the liquid crystal display panel covers a portion of corresponding white sub-pixel and shading gaps; and
   wherein the white sub-pixel is provided with a filter layer, and a material of the filter layer is a photoresist for filtering light having wavelengths above 580 nm.

11. The liquid crystal display panel as claimed in claim 10, wherein sizes and shapes of all of the four sub-pixels are same; and a spacing between two adjacent fingerprint identification units in a same row is less than or equal to a sum of a width of one of the four sub-pixels and widths of the shading gaps on both sides of the one of the four sub-pixels.

12. The liquid crystal display panel as claimed in claim 10, wherein the four sub-pixels further comprise a red sub-pixel, a blue sub-pixel, and a green sub-pixel;
   wherein the red sub-pixel is diagonally disposed with the white sub-pixel, and the blue sub-pixel is disposed diagonally with the green sub-pixel.

13. The liquid crystal display panel as claimed in claim 10, wherein the filter layer is disposed on a side away from a corresponding fingerprint identification unit.

14. The liquid crystal display panel as claimed in claim 10, wherein the white sub-pixel is provided with a hollow portion, and the hollow portion is filled with filter material to form the filter layer.

15. The liquid crystal display panel as claimed in claim 13, wherein the projection of each of the fingerprint identification units in the direction perpendicular to the liquid crystal display panel covers a portion of a corresponding filter layer or whole of the corresponding filter layer, or the projection of each of the fingerprint identification units in the direction perpendicular to the liquid crystal display panel does not overlap the corresponding filter layer.

16. The liquid crystal display panel as claimed in claim 14, wherein the projection of each of the fingerprint identification units in the direction perpendicular to the liquid crystal display panel covers a portion of a corresponding filter layer or whole of the corresponding filter layer, or the projection of each of the fingerprint identification units in the direction perpendicular to the liquid crystal display panel does not overlap the corresponding filter layer.

17. The liquid crystal display panel as claimed in claim 10, wherein the liquid crystal display panel further comprises an array substrate and a cover plate disposed opposite to each other; and wherein the pixel units are disposed on a side of the cover plate facing the array substrate, and the fingerprint identification units are disposed between the pixel units and the array substrate.

\* \* \* \* \*